Oct. 25, 1966   N. N. GOLDBERG   3,280,713
CONTROL MECHANISM FOR A ROLL FILM CAMERA
Filed Dec. 4, 1964   3 Sheets-Sheet 1

INVENTOR.
NORMAN N. GOLDBERG
BY Joseph G. Werner
ATTORNEY

Oct. 25, 1966    N. N. GOLDBERG    3,280,713
CONTROL MECHANISM FOR A ROLL FILM CAMERA
Filed Dec. 4, 1964    3 Sheets-Sheet 3
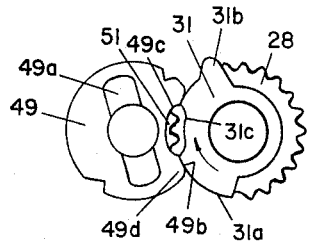
Fig.3
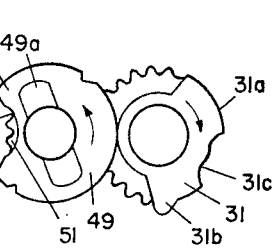
Fig.4
Fig.5
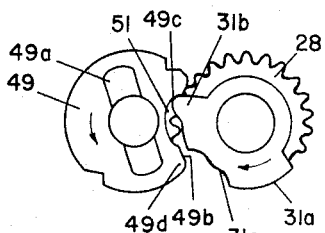
Fig.6
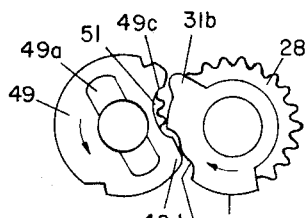
Fig.7
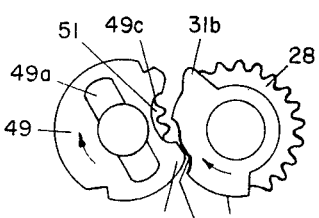
Fig.8
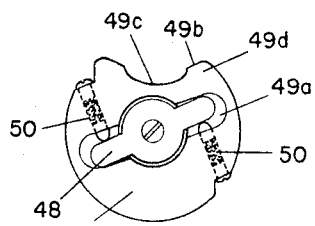
Fig.9
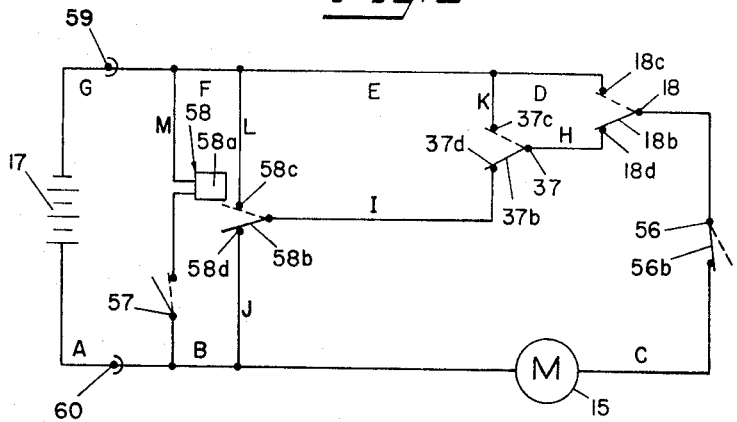
Fig.10
INVENTOR.
NORMAN N. GOLDBERG
BY Joseph G. Werner
ATTORNEY

United States Patent Office 3,280,713
Patented Oct. 25, 1966

3,280,713
CONTROL MECHANISM FOR A ROLL
FILM CAMERA
Norman N. Goldberg, Madison, Wis., assignor to E. Leitz,
Inc., New York, N.Y., a corporation of New York
Filed Dec. 4, 1964, Ser. No. 416,018
15 Claims. (Cl. 95—31)

This invention relates to a camera control mechanism and more particularly to a mechanism for controlling the rapid sequence operation of a roll film camera.

Such mechanism which permits the making of a series of film exposures in rapid succession finds particular use in press photography as well as in the photographic instrumentation of air reconnaissance and space exploration vehicles.

It is an object of this invention to provide a new and improved mechanism for use in connection with a roll film camera for making film exposures in rapid sequence.

It is another object of this invention to provide a motorized mechanism for use in connection with a roll film camera to make film exposures in rapid sequence, having means for dynamically braking the drive motor.

Another object of this invention is to provide a mechanism for use in connection with a roll film camera for making film exposures in rapid sequence which can be remotely controlled by an operator positioned at some distance from the camera.

Another object of this invention is to provide a mechanism for use in connection with a roll film camera for making a preselected number of film exposures in rapid sequence.

Still another object of this invention is to provide a mechanism for use in connection with a roll film camera for making both rapid sequence film exposures and individual exposures when desired.

It is a further object of this invention to provide a motorized mechanism having means for advancing the film winding mechanism of a roll film camera which absorbs the inertial starting shock of the motor and which compensates for the normal wear of parts and backlash.

It is a still further object of this invention to provide a mechanism for use in connection with a roll film camera in which the film advancing means is positively held against rotation during exposure of the film.

Other objects and advantages will be readily apparent from the following detailed description taken in conjunction with the accompanying drawings disclosing a preferred exemplary embodiment of my invention.

In the drawings:

FIGS. 3-8 are a series of bottom views of certain parts of my invention showing their co-action during one picture taking cycle.

FIG. 9 is a bottom view of a portion of the film advancing means of my invention.

FIG. 10 is a schematic drawing showing the electrical circuitry of my invention.

Figure 1:
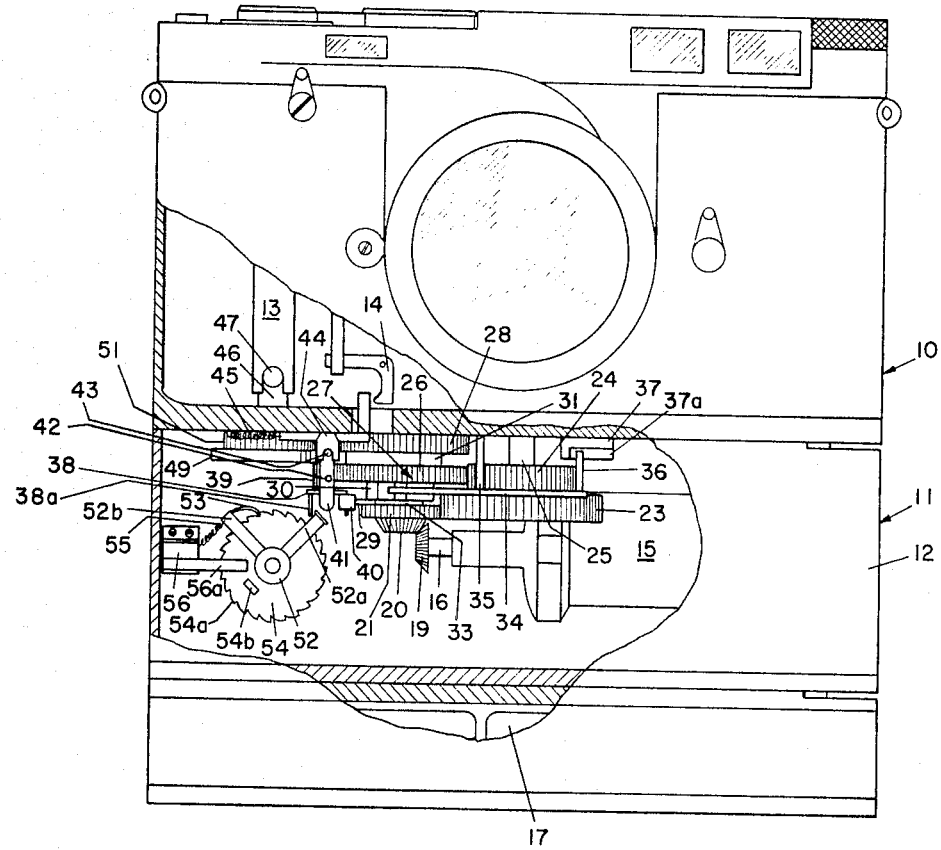
FIG. 1 is a front elevation view of my invention attached to a roll film camera with parts broken away.

Referring now more specifically to the drawings, FIG. 1 shows a standard roll film camera 10 to which mechanism 11 comprising my invention is attached. Housing 12 of the mechanism 11 is attachable to the camera 10 in the same manner as a standard camera base plate. The film winding mechanism 13 of camera 10 and its shutter tripping means 14 are shown in the broken out portion of the camera 10 in FIG. 1.

Figure 2:
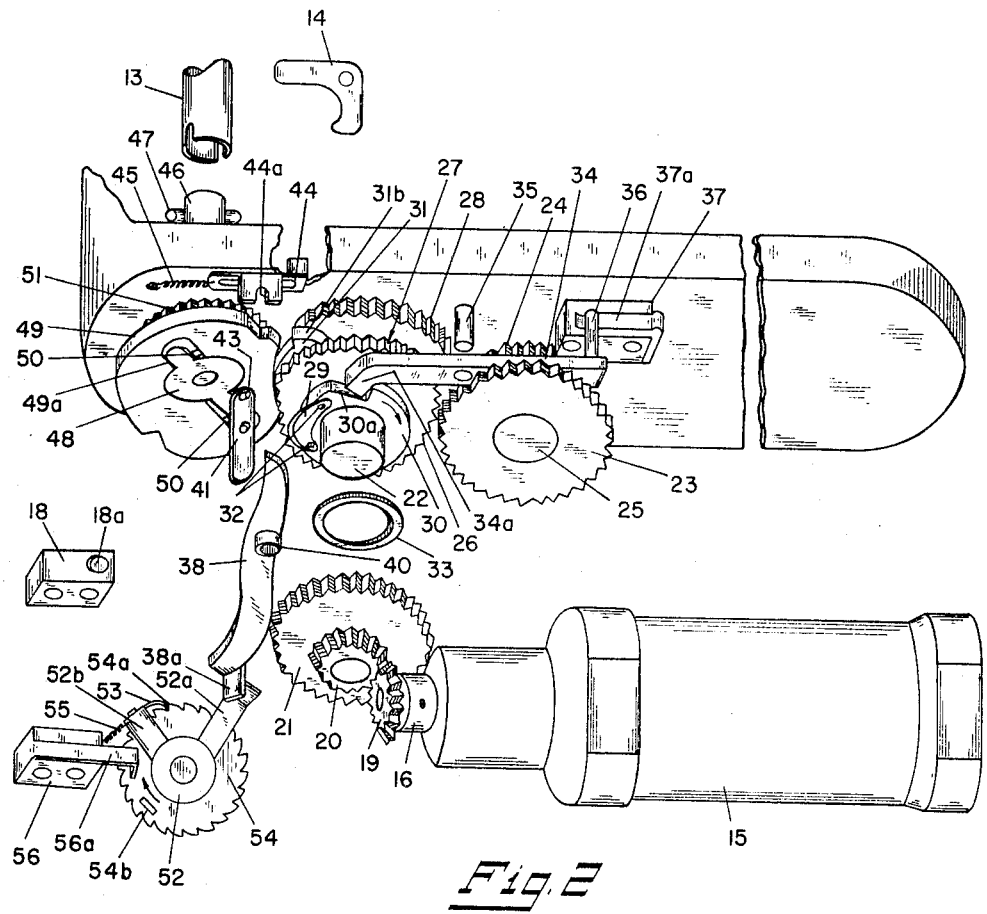
FIG. 2 is an exploded perspective view of my invention with parts broken away.

As shown in FIGS. 1 and 2, the mechanism 11 has a drive motor unit, preferably comprising an electrical motor 15 having a drive shaft 16 adapted to be driven at a constant angular velocity. The motor 15 is energized from a power source shown here in the form of batteries 17.

The motor 15 is started by the operator by closing trigger switch 18 by depressing actuator button 18a which completes electrical circuit ABCDEFG, as seen in FIG. 10, between the power source 17 and motor 15. The trigger switch 18 is of the single-pole double-throw type and has a switch arm 18b and a pair of contacts 18c and 18d, shown schematically in FIG. 10. The switch 18 will be referred to as being closed when switch arm 18b is in engagement with contact 18c, as shown in phantom in FIG. 10, and as being open when arm 18b is in engagement with contact 18d, as shown in full lines.

Referring again to FIGS. 1 and 2, drive shaft 16 has a bevel gear 19 attached thereto which engages a second bevel gear 20 which is fixed to gear 21. Both gears 20 and 21 are mounted for rotation on main shaft 22.

Gear 21 meshes with gear 23 which is fixed to gear 24. Gears 23 and 24 are mounted for rotation on jack shaft 25. Gear 24 meshes with gear 26 which is fixed to an assembly of gears and cams attached together in fixed relation for rotation as a unit on main shaft 22. This assembly of gears and cams, hereinafter referred to as the stack, is generally shown at 27 and comprises gear 26, drive gear 28, actuator cam 29, stop cam 30 and drive cam 31. Actuator cam 29 is preferably attached to stop cam 30 by a pair of screws 32. A washer 33 is slightly thicker than actuator cam 29 and is mounted on shaft 22 for spacing gear 21 from cam 29.

The stack 27 is adapted to rotate one complete revolution for each picture taking cycle. Rotation of stack 27 is initiated by closing the trigger switch 18 and energizing motor 15. Means are provided for completing the remainder of the revolution which the stack 27 is making when the operator releases trigger switch 18 and for dynamically braking the motor 15.

FIG. 2 shows the stack 27 at the start of a picture taking cycle. When the motor 15 is started by the closing of trigger switch 18, the drive shaft 16, via the aforementioned gear transmission, drives the stack 27 in the direction shown by the arrow on stop cam 30 in FIG. 2. When the stack 27 begins to rotate the hooked end 34a of follower arm 34 will immediately be forced out of the notched portion 30a of stop cam 30 and pivot the arm 34 about pin 35, thus causing the post 36 on arm 34 to close switch 37 by movement of switch actuator 37a.

As shown in FIG. 10, the switch 37 is of the single-pole double-throw type and has a switch arm 37b and a pair of contacts 37c and 37d. The switch is referred to as being closed when switch arm 37b is engaging contact 37c, as shown in phantom in FIG. 10, and as being open when engaging contact 37d, as shown in full lines.

The closing of switch 37 completes a second electrical circuit ABCHKEFG, as seen in FIG. 10, between the power source 17 and motor 15. Thus, even if the trigger switch 18 is immediately released, the motor would continue to run until stack 27 makes a complete revolution and the hooked end 34a of follower arm 34 drops into the notched portion 30a of stop cam 30 and opens switch 37. When this happens, switch arms 18b and 37b are open, that is, in engagement with contacts 18d and 37d, respectively, as shown in full lines in FIG. 10, and a circuit CHIJ, as seen in FIG. 10, is closed around motor 15. Braking action of the motor 15, called "dynamic braking," is then obtained by virtue of the motor 15 acting as a generator dissipating the energy of rotation as heat in the closed circuit CHIJ.

It is apparent from FIG. 10 that just as switch 37 is employed to override trigger switch 18, the trigger switch 18 will override switch 37 when the operator wishes to take more than one picture in rapid succession, and the number of pictures taken will be controlled by the length of time the operator keeps the trigger switch 18 closed.

FIGS. 1 and 2 show the preferred means of my invention for actuating the shutter tripping means 14 of the camera 10. The initial rotation of stack 27 causes lever arm 38 to be pivoted on post 39 through the action of actuator cam 29 on roller 40 which is rotatably mounted on arm 38. Lever arm 38 pivots lever 41 which is pivotably mounted on post 42. Lever 41 has a pin 43 therein which is engaged in slot 44a of slidably mounted bracket 44. The sliding movement imparted to bracket 44 by lever 41 actuates the shutter tripping means 14 of the camera 10, thus, making a film exposure. Bracket 44, lever 41 and lever arm 38 are returned to their normal position by spring 45.

Referring again to the camera 10 of FIG. 1, it is necessary that the film winding mechanism 13 be rotated after each exporsure of the film to position a new segment of film for the succeeding exposure. It is also essential that the film winding mechanism 14 remain stationary for the period of time during which an exposure is made. Further, it is desirable to provide a spring loaded system which will absorb the inertial starting shock of the motor 15 and which will compensate for the normal wear of transmission parts.

As best seen in FIGS. 1 and 2 the output shaft 46 is detachably coupled to the film winding mechanism 13 of the camera 10 by pin 47. The shaft 46 has a transversely extending web 48 attached to its lower end in fixed relation. Intermittent cam 49 has a groove 49a therein which is adapted to loosely receive the web 48. The web 48 can preferably rotate in the range of 10–20 degrees relative to cam 49 in groove 49a. As shown in FIG. 9, a pair of springs 50 bias the web 48 against the side of groove 49a. Intermittently driven gear 51 is fixedly attached to cam 49 for imparting motion thereto. The gear 51 is engageable with the drive gear 28 of stack 27. Drive gear 28 has gear teeth on approximately one-half of its periphery and therefore drives gear 51 intermittently. Driven gear 51 is adapted to be rotated 360 degrees by approximately one-half of a revolution of gear 28.

FIGS. 3–8 depict the means for advancing the film winding mechanism 13 of the camera 10 through one full picture taking cycle. When the trigger switch 18 is closed and the initial rotation of stack 27 is causing a film exposure to be made, the intermittent cam 49, and consequently the film winding mechanism 13, is locked against rotation as shown in FIG. 3. The convex locking surface 31a of cam 31 slideably mates with the concave locking surface 49b of intermittent cam 49, thus, holding cam 49 stationary.

Referring now to FIG. 4 showing the advancing means after a film exposure has been made, convex locking surface 31a has passed out of engagement with concave locking surface 49b and the gear teeth of drive gear 28 begin to mesh with those of driven gear 51.

FIG. 5 shows gear 51 when it has been driven through approximately one-half of the revolution imparted to it by gear 28.

FIG. 6 shows driven gear 51 after a 360-degree rotation has been imparted to it by drive gear 28. Drive gear 28 is shown after having passed out of engagement with gear 51. As gear 28 passes out of engagement with gear 51 protrusion 31b of drive cam 31, having entered recess 49c of driven cam 49, engages cam 49.

FIG. 7 shows the important "overdrive" feature of my invention which automatically compensates for the normal wear of transmission and camera parts. The protrusion 31b of cam 31 imparts a slight additional rotation to cam 49, preferably in the range of about 10–20 degrees, beyond the full revolution imparted thereto by the action of gears 28 and 51. Any of this additional rotation or "overdrive" which is not needed to properly position the film for the succeeding exposure will be absorbed by the springs 50. This spring loaded system is self-compensating in that springs 50 are stiff enough to drive the camera's film winding mechanism 13 and yet will compress to the necessary length if the sytem does not require overdriving without injury to the motor 15 or camera 10.

FIG. 8 shows the heel portion 49b of cam 49 sliding backwardly in recess 31c of cam 31. The heel portion 49d rides out of recess 31c and cam 49 is then locked against rotation as shown in FIG. 3 and a full picture cycle has been completed.

Referring again to FIGS. 1 and 2, my mechanism 11 is provided with means for automatically shutting off the motor 15 after the last picture has been taken on the film and for shutting off the motor 15 after a pre-selected number of pictures have been taken in rapid sequence. Lever 38 has a lug 38a thereon which is adapted to move against L-shaped leg 52a of hub 52 which is mounted for rotation on the mechanism housing 12. Hub 52 has a second leg 52b which has a pawl 53 on its free end. An indicator wheel 54 is concentrically mounted for rotation about hub 52. Indicator wheel 54 has indicia thereon (not shown) representing the total number of pictures that can be taken on the camera film, and has corresponding ratchet teeth 54a. Lever arm 38 is pivoted or jogged by actuation cam 29 at the start of each revolution of stack 27. The action of lever arm 38 on leg 52a of hub 52 causes pawl 53 to move ahead against rachet teeth 54a and rotate or index wheel 54 through one picture position for each revolution of stack 27. The wheel 54 thus indicates to the operator the number of pictures taken. After each actuation of wheel 54, the hub is returned to its normal position by spring 55.

A limiting or shut-off switch 56 having an actuator 56a and a switch arm 56b is mounted adjacent to wheel 54. The wheel 54 as a recess 54b therein which is adapted to receive actuator 56a to open the switch 56 and shut off the motor 15 when the wheel 54 is rotated to such a position that recess 54b is directly aligned with the arm 56a.

When it is desired to record an event with a sequence of pictures taken in rapid succession without regard to the number of pictures to be taken, the operator will manually set wheel 54 to that number representing the last picture that can be taken on the film. This will close limiting or shut-off switch 56 and it will remain closed until the entire film is exposed. The operator is then ready to take a sequence of pictures and can do so by merely aiming the camera and closing trigger switch 18. Film exposures will be made in rapid succession as long as the operator keeps the trigger switch 18 closed, or until the entire film has been exposed. In the latter case, switch 56 will automatically be opened when the actuator 56a drops into the recess 54b in indicator wheel 54, thus, shutting off motor 15.

If the operator desires to limit the number of exposures to be made in a particular sequence, he will first manually rotate the indicator wheel 54 in the direction of the arrow on the wheel 54 in FIG. 2 to the indicia representing the last exposure of the series to be taken. He then aims the camera and closes the trigger switch 18 and holds it closed. When the pre-selected number of exposures has been made the indicator wheel 54 will have been rotated to such a position that actuator 56a will drop into recess 54b to open switch 56 and, thus, shut off motor 15. When this happens the switch 56 may shut off motor 15 before the film has been completely advanced for the next exposure. The operator must then turn the wheel 54 to the indicia representing the next exposure. This will cause the film to be completely advanced into position for exposure. The camera 10 is then again ready for picture taking.

My invention can be used for making both rapid sequence film exposures and individual exposures when desired. To make a single film exposure, the operator merely pulses, that is, depresses and immediately releases, the actuator button 18a of trigger switch 18. Switch 37 will cause a single full picture cycle to be made as described hereinbefore.

FIG. 10 shows a remote control switch 57 which may be at some distance from the rest of mechanism 11 for controlling the motor 15 by means of a relay switch, shown generally at 58. The relay switch 58 has a coil 58a, a switch arm 58b and a pair of contacts 58c and 58d. The relay is closed when arm 58b is in engagement with contact 58c as shown in phantom in FIG. 10. It will normally be in open position as shown in full lines in FIG. 10. Pressure contacts 59 and 60 are provided to connect the battery power source 17 to the motor 15 so that there is no need for a connecting cord.

To control the mechanism 11 remotely, the operator merely closes switch 57 which energizes coil 58a which in turn attracts switch arm 58b and closes the relay switch 58. This completes a circuit ABCHILFG between power source 17 and motor 15.

When the operator opens remote control switch 57, switch arm 58b swings back into engagement with contact 58d and switch 37 carries the stack 27 through to a full cycle via circuit ABCHKEFG and then dynamically brakes the motor 15 by closing circuit CHIJ around motor 15 as described hereinbefore.

It is understood that the present invention is not confined to the particular construction and arrangement of parts herein illustrated and described, but embraces all such modified forms thereof, as may come within the scope of the following claims.

I claim:

1. Mechanism for the rapid sequence operation of a roll film camera having a film winding mechanism and shutter tripping means comprising:
   (a) a motor drive unit comprising a power source and an electrical motor having a drive shaft adapted to be driven at a constant angular velocity,
   (b) a first switch for completing a first electrical circuit between said power source and said motor to start said motor,
   (c) means responsive to the rotation of said drive shaft for actuating the shutter tripping means of said camera,
   (d) means responsive to the rotation of said drive shaft for advancing the film winding mechanism of said camera after each actuation of the shutter tripping means of said camera,
   (e) a second switch for completing a second electrical circuit between said power source and said motor for continuing the rotation of said drive shaft after said first switch has been opened, and
   (f) means responsive to the rotation of said drive shaft for operating said second switch to interrupt said second electrical circuit and to complete a third circuit around said motor for dynamically braking said motor.

2. Mechanism for the rapid sequence operation of a roll film camera having a film winding mechanism and shutter tripping means comprising:
   (a) a motor drive unit comprising a power source and an electrical motor having a drive shaft adapted to be driven at a constant angular velocity,
   (b) a first switch for completing a first electrical circuit between said power source and said motor to start said motor,
   (c) a stack of gears and cams attached together in fixed relation for rotation as a unit, said stack being adapted to make one complete revolution for each film exposure,
   (d) transmission means for transmitting rotation of the drive shaft of said motor to said stack,
   (e) means responsive to the rotation of the stack for actuating the shutter tripping means of said camera,
   (f) means responsive to the rotation of said stack for advancing the film winding mechanism in said camera after each actuation of the shutter tripping means of said camera,
   (g) a second switch for completing a second electrical circuit between said power source and said motor to facilitate the completing of the remainder of the revolution which the stack is making when said first switch is opened, and
   (h) means responsive to the rotation of said stack for operating said second switch to interrupt said second electrical circuit and to complete a third circuit around said motor for dynamically braking said motor.

3. Mechanism for the rapid sequence operation of a roll film camera having a film winding mechanism and shutter tripping means comprising:
   (a) a motor drive unit comprising a power source and an electrical motor having a drive shaft adapted to be driven at a constant angular velocity,
   (b) a first switch for completing a first electrical circuit between said power source and said motor to start said motor,
   (c) a stack of gears and cams attached together in fixed relation for rotation as a unit, said stack being adapted to make one complete revolution for each film exposure,
   (d) transmission means for transmitting rotation of the drive shaft of said motor to said stack,
   (e) means responsive to the rotation of a first cam in said stack for actuating the shutter tripping means of said camera,
   (f) rotatably mounted advancing means responsive to the rotation of a first gear in said stack for advancing the film winding mechanism of said camera after each actuation of the shutter tripping means of said camera,
   (g) a second switch for completing a second electrical circuit between said power source and said motor to facilitate completing the remainder of the revolution which the stack is making when said first switch is opened, and
   (h) means responsive to the rotation of a second cam in said stack for operating said second switch for interrupting said second electrical circuit and completing a third circuit around said motor to dynamically brake said motor.

4. The mechanism as specified in claim 3 including a third cam in said stack for positively holding said advancing means against rotation during exposure of the film.

5. Mechanism for the rapid sequence operation of a roll film camera having a film winding mechanism and shutter tripping means comprising:
   (a) a motor drive unit comprising a power source and an electric motor having a drive shaft adapted to be driven at a constant angular velocity,
   (b) a first switch for completing a first electrical circuit between said power source and said motor to start said motor,
   (c) a stack comprising a drive gear, an actuator cam and a stop cam having a notched portion therein, said gear and cams being attached together in fixed relation for rotation as a unit, said stack being adapted to make one complete revolution for each film exposure,
   (d) transmission means for transmitting rotation of the drive shaft of said motor to said stack,
   (e) a pivotably mounted lever arm responsive to the rotation of the actuator cam for actuating the shutter tripping means of said camera,
   (f) means responsive to the rotation of said drive gear for advancing the film winding mechanism of said camera after each actuation of the shutter tripping means of said camera, (g) a second switch for completing a second electrical circuit between said power source and said motor to facilitate completing the remainder of the revolution which the stack is making when said first switch is opened, and (h) a pivotably mounted follower arm adapted to be engaged in the notch portion of said stop cam to open said second switch for interrupting said second electrical circuit and completing a third circuit around said motor to dynamically brake said motor.

6. Mechanism for the rapid sequence operation of a roll film camera having a film winding mechanism and shutter tripping means comprising;

(a) a motor drive unit comprising a power source and an electrical motor having a drive shaft adapted to be driven at a constant angular velocity, (b) a first switch for completing a first electrical circuit between said power source and said motor to start said motor, (c) means responsive to the rotation of said drive shaft for actuating the shutter tripping means of said camera, (d) means for rotating the film winding mechanism of said camera after each actuation of the shutter tripping means of said camera comprising, an output shaft adapted to be coupled to the film winding mechanism of said camera, said output shaft having a transversely extending web attached thereto in fixed relation, a rotatably mounted member having a groove therein loosely receiving said web, resilient means engaging said web for transmitting the rotation of said member to said output shaft, and means responsive to the rotation of said drive shaft for rotating said member.

7. The mechanism as specified in claim 6 including;

(e) a second switch for completing a second electrical circuit between said power source and said motor for continuing the rotation of said drive shaft after said first switch has been opened, and (f) means responsive to the rotation of said drive shaft for operating said second switch to interrupt said second electrical circuit and to complete a third circuit around said motor for dynamically braking said motor.

8. The mechanism as specified in claim 6 including:

(e) indicator means for manually selecting the number of film exposures to be made, (f) means responsive to the rotation of said drive shaft for indexing said indicator means, and (g) a shut-off switch for interrupting said electrical circuit when the indicator means indicates that the selected number of film exposures has been made.

9. Mechanism for the rapid sequence operation of a roll film camera having a film winding mechanism and shutter tripping means comprising:

(a) a motor drive unit comprising a power source and an electric motor having a drive shaft adapted to be operated at a consant angular velocity, (b) a first switch for completing a first electrical circuit between said power source and said motor to start said motor, (c) a stack comprising a drive gear and a drive cam attached together in fixed relation for rotation as a unit, said stack being adapted to make one complete revolution for each film exposure made, (d) transmission means for transmitting rotation of the drive shaft of said motor to said stack, (e) means responsive to the rotation of the stack for actuating the shutter tripping means of said camera, (f) advancing means for rotating the film winding mechanism of said camera after each actuation of the shutter tripping means of said camera, said advancing means comprising an output shaft adapted to be coupled to the film winding mechanism of said camera and having a transversely extending web attached thereto in fixed relation, a driven cam having a groove therein adapted to loosely receive said web, resilient means engaging said web for transmitting the rotation of said driven cam to said output shaft, a driven gear fixedly attached to said driven cam for rotation therewith, said driven gear being engageable with the drive gear in said stack and being adapted to be rotated 360 degrees thereby after each actuation of the shutter tripping means of said camera, said drive cam in said stack having a protrusion thereon adapted to engage and rotate the driven cam beyond the 360-degree revolution imparted thereto by the co-action of said driven cam and said drive gear.

10. The mechanism as specified in claim 9 wherein said drive gear of said stack has gear teeth on only a portion of its perimeter.

11. The mechanism as specified in claim 9 wherein said driven cam of said advancing means has a concave locking surface adapted to slidably mate with a convex locking surface of said drive cam of said stack and be locked thereby against rotation during exposure of the film.

12. The mechanism as specified in claim 9 including:

(g) a second switch for completing a second electrical circuit between said power source and said motor to facilitate the completing of the remainder of the revolution which the stack is making when the first switch is opened, and (h) means responsive to the rotation of said stack to open said second switch for interrupting said second electrical circuit and completing a third circuit around said motor to dynamically brake said motor.

13. Mechanism for the rapid sequence operation of a roll film camera having a film winding mechanism and shutter tripping means comprising:

(a) a motor drive unit comprising a power source and an electrical motor having a drive shaft adapted to be driven at a constant angular velocity, (b) a first switch for completing an electrical circuit between said power source and said electrical motor to start said motor, (c) means responsive to the rotation of said drive shaft for actuating the shutter tripping means of said camera, (d) means responsive to the rotation of said drive shaft for advancing the film winding mechanism of said camera after each actuation of the shutter tripping means of said camera, (e) indicator means for manually selecting the number of film exposures to be made, (f) means responsive to the rotation of said drive shaft for indexing said indicator means, and (g) a shut-off switch for interrupting said electrical circuit when the indicator means indicates that the preselected number of film exposures has been made.

14. Mechanism for the rapid sequence operation of a roll film camera having film winding mechanism and shutter tripping means comprising:

(a) a motor drive unit comprising a power source and an electric motor having a drive shaft adapted to be driven at a constant angular velocity, (b) a first switch for completing an electrical circuit between said power source and said motor to start said motor, (c) a stack of gears and cams attached together in fixed relation for rotation as a unit, said stack being adapted to make one complete revolution for each film exposure, (d) transmission means for transmitting rotation of the drive shaft of said motor to said stack, (e) means responsive to the rotation of said stack for actuating the shutter tripping means of said camera, (f) means responsive to the rotation of said stack for advancing the film winding mechanism of said camera after each actuation of the shutter tripping means of said camera, (g) indicator means for manually selecting the number of film exposures to be made, (h) means responsive to the rotation of said stack for indexing said indicator means, and (i) a shut-off switch for interrupting said electrical circuit when the indicator means indicates that the preselected number of film exposures has been made.

15. Mechanism for the rapid sequence operation of a roll film camera having film winding mechanism and shutter tripping means comprising:

(a) a motor drive unit comprising the power source and an electric motor having a drive shaft adapted to be driven at a constant angular velocity, (b) a first switch for completing an electrical circuit between said power source and said motor to start said motor, (c) a stack of gears and cams attached together in fixed relation for rotation as a unit, said stack being adapted to make one complete revolution for each film exposure, (d) transmission means for transmitting rotation of the drive shaft of said motor to said stack, (e) means responsive to the rotation of said stack for actuating the shutter tripping means of said camera, (f) means responsive to the rotation of said stack for advancing the film winding mechanism of said camera after each actuation of the shutter tripping means of said camera, (g) a rotatably mounted indicator wheel having indicia thereon representing the number of exposures that can be made of said film and having a corresponding number of ratchet teeth, said wheel being adapted for manual selection of the number of film exposures to be made, said wheel having a recess therein, (h) means responsive to the rotation of said stack and engageable with said ratchet teeth for indexing said wheel, and (i) a shut-off switch having an actuator adapted to drop into said recess for interrupting said circuit when the selected number of film exposures has been made.

References Cited by the Examiner

UNITED STATES PATENTS

| | | | |
|---|---|---|---|
| 3,007,385 | 11/1961 | Fukuoka | 95—31 |
| 3,064,522 | 11/1962 | Fukuoka | 95—31 |
| 3,088,388 | 5/1963 | Tredopp | 95—31 |
| 3,135,181 | 6/1964 | Gevatter | 95—31 |

NORTON ANSHER, *Primary Examiner.*